US007539660B2

(12) United States Patent
Focazio et al.

(10) Patent No.: US 7,539,660 B2
(45) Date of Patent: May 26, 2009

(54) METHOD AND SYSTEM FOR GENERATING SQL JOINS TO OPTIMIZE PERFORMANCE

(75) Inventors: Robyn Lee Focazio, Round Rock, TX (US); Kumar Marappan, Round Rock, TX (US); Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/692,166

(22) Filed: Oct. 23, 2003

(65) Prior Publication Data

US 2005/0091199 A1    Apr. 28, 2005

(51) Int. Cl.
*G06F 7/00* (2006.01)
*G06F 17/30* (2006.01)
(52) U.S. Cl. .................................. 707/2; 707/3; 707/4
(58) Field of Classification Search ............... 707/1–10, 707/101–102, 200
See application file for complete search history.

(56) References Cited

U.S. PATENT DOCUMENTS

| 5,418,950 | A | * | 5/1995 | Li et al. ........................... 707/4 |
| 5,548,755 | A | | 8/1996 | Leung et al. ................. 395/600 |
| 5,664,173 | A | * | 9/1997 | Fast ............................... 707/4 |
| 5,680,603 | A | | 10/1997 | Bhargava et al. ............ 395/602 |
| 5,822,750 | A | | 10/1998 | Jou et al. ........................ 707/2 |
| 5,832,477 | A | | 11/1998 | Bhargava et al. ............... 707/2 |
| 6,088,691 | A | | 7/2000 | Bhargava et al. ............... 707/2 |
| 6,748,374 | B1 | * | 6/2004 | Madan et al. .................. 707/3 |
| 2002/0143749 | A1 | * | 10/2002 | Hartel et al. ................... 707/3 |
| 2002/0169768 | A1 | * | 11/2002 | Lowe et al. .................... 707/4 |
| 2003/0093374 | A1 | * | 5/2003 | Fenlon et al. ................ 705/40 |
| 2003/0167258 | A1 | * | 9/2003 | Koo et al. ...................... 707/2 |
| 2004/0220917 | A1 | * | 11/2004 | Evans et al. ................... 707/3 |
| 2004/0220928 | A1 | * | 11/2004 | Evans et al. ................... 707/4 |

OTHER PUBLICATIONS

Icetips Cowboy SQL Templates (Icetips Cowboy SQL Templates User's Guide, Version 6.0, Feb. 20, 2003).*

* cited by examiner

*Primary Examiner*—Hosain T Alam
*Assistant Examiner*—Shew-Fen Lin
(74) *Attorney, Agent, or Firm*—Yee & Associates, P.C.; William H. Steinberg; Rudolf O. Siegesmund

(57) ABSTRACT

An automated method for creating only the necessary joins in a SQL query. The present invention comprises a Query Program (QP), a Query Generation Program (QGP), and a Clause Generation Program (CGP). The QP accepts the query fields, filters, and sort criteria from the user, generates the query, sends the query to the database, and displays the query results. The QGP creates the query clause strings and inserts the strings into the SQL template. The QGP generates the SELECT, (filter) WHERE, and ORDER BY clauses. The QGP analyzes each parameter in a parameter list to determine if the parameter is on the added aliases list. If the parameter is not on the added aliases list, the QGP runs the CGP for the parameter. The CGP generates the FROM, JOIN, and (join) WHERE clauses and adds the clauses to the appropriate clause strings.

1 Claim, 3 Drawing Sheets

METHOD AND SYSTEM FOR GENERATING SQL JOINS TO OPTIMIZE PERFORMANCE

FIELD OF THE INVENTION

The present invention is directed generally to a method for improving performance of a SQL query and specifically to a method for decreasing the time required for a computer to process a SQL query by only making the necessary table joins in the SQL template.

BACKGROUND OF THE INVENTION

A database query is a request for a set of information from at least one table in a database. Queries are well known in the art. Queries are written in Structured Query Language (SQL), which is the de facto standard computer language for querying, updating, and managing databases. In a SQL query, a user specifies the desired columns in the database and the desired filters for filtering out unwanted data rows. For example, a basic query looks like:

```
SELECT last_name, first_name, city, state, zip
FROM addresses
WHERE state='TX'
```

The above query returns a list of addresses from the "addresses" table in a database. The returned list contains addresses for people living in Texas and lists their last name, first name, city, state, and zip code. In the example query above, the user has included a SELECT clause, a FROM clause, and a WHERE clause. The SELECT clause specifies the columns which the user desires from the addresses table. The FROM clause specifies that the query is to search the addresses table. The WHERE clause filters out the rows in the addresses table which do not contain TX in the state column. Persons of ordinary skill in the art are aware of how to write a query using SELECT, FROM, and WHERE clauses.

When the desired data is located in a plurality of tables, the query has to join together the plurality of tables in order to gather the requested data. For example, consider a database comprising three tables: table "addresses" containing the columns "customer_ID," "last_name," "first_name," "city," "state," and "zip," table "orders" containing the columns "customer_ID," "order_no," "quantity," and "description," and table "DVD_list" containing "last_name," "first_name," and "quantity." Each table contains information stored in a plurality of rows. If an administrator wants an alphabetical listing of the customers who ordered DVD players and live in Texas, including the number of DVD players ordered, the query would be:

```
SELECT last_name, first_name, quantity
FROM addresses AS A
JOIN DVD_list AS D
    ON A.customer_ID=D.customer_ID
JOIN orders AS O
    ON O.customer_ID=D.customer_ID
WHERE A.state='TX' AND O.description='DVD Player'
ORDER BY 1
```

As previously stated, the required information was not present in a single table. Therefore, the user wrote a query that joins the addresses table and the orders table into the DVD_list table. The above query contains a JOIN command, which joins one table to another. When the JOIN command is used without a modifier (i.e. OUTER JOIN or LEFT OUTER JOIN), the JOIN command is an inner join and includes only the rows that contain non-null data entries. The ON command specifies how the tables relate to one another and sets the joining criteria. In other words, the ON command specifies the joining conditions, which is how the rows in the two tables line up together when the tables are joined. The WHERE command specifies the filtering condition that determines which rows are desired in the output by filtering out the unwanted rows. The AND command is used when specifying numerous WHERE commands.

In the previous example, the user used an alias for each table in order to make the query easier to write and read. Aliases are recognized by the AS command. The aliases are A for the addresses table, D for the DVD_list table, and O for the orders table. The user also specified that the returned table should be sorted by the first column using the ORDER BY 1 command. Alternatively, the user could have accomplished the same result by substituting the last line of the query with ORDER BY last_name.

The query listed above is the more complex syntax for writing a query. Newer versions of SQL allow the user to write the same query in a simpler syntax:

```
SELECT last_name, first_name, quantity
FROM addresses A, orders O, DVD_list D
WHERE A.customer_ID=D.customer_ID AND O.customer_ID=
D.customer_ID
    AND A.state='TX' AND O.description='DVD Player'
ORDER BY 1
```

The above query eliminates the need for the explicit JOIN, ON, and AS commands. The FROM command lists all of the tables which will be joined, separated by commas. The aliases for the tables are specified immediately after the table name in the FROM command. The joining conditions are placed in the WHERE command along with the filtering conditions. It is important when using the above syntax that the two types of WHERE clauses are distinguished from each other. The first two clauses in the WHERE clause above are the joining conditions and are referred to herein as (join) WHERE clauses. The last two clauses in the WHERE clause above are filtering conditions and are referred to herein as (filter) WHERE clauses. Persons of ordinary skill in the art can appreciate the difference between (join) WHERE clauses and (filter) WHERE clauses in a query.

When dealing with queries, the users frequently want to request a dynamic set of fields. In other words, the user would like to be able to create a SQL template which contains most of the necessary language for writing the query, but lacks the specific SELECT, FROM, JOIN, and WHERE clauses. An example of a SQL template is:

SELECT * FROM $F $J WHERE

When the user dynamically creates the SQL query, the * is replaced by the columns in the SELECT clause, the $F placeholder is replaced by the generated FROM clause, the $J placeholder is replaced by the generated JOIN clause, and the (join) and (filter) WHERE clauses will be appended after the WHERE clause. Thus, when using these SQL templates, the administrator only needs to fill in the desired fields and filters to complete the query. The prior art method of creating the SQL template is to join together every database table and use WHERE clauses to filter out the unwanted information. For example, if an administrator has an order ID and wants the user's name and email address, the prior art query looks like:

```
SELECT b.user_name, b.user_email
FROM Orders a, Users b, Addresses c, Products d, OrdersProductMap e
WHERE a.user_id=b.user_id AND b.user_id=c.user_id AND
a.order_id=e.order_id
    AND e.product_id=d.product_id AND a.order_id="1234"
```

The above query is preferred by SQL templates because all of the tables in the database have been joined together. The user need only enter the appropriate SELECT and WHERE clauses to obtain the desired output from the query.

However, the prior art method is inefficient in that it unnecessarily joins all of the tables together to obtain the desired information. A more efficient method of executing the query would only join the minimum amount of tables required to obtain the desired output. Using the above example, a query with only the necessary joins looks like:

```
SELECT b.user_name, b.user_email
FROM Orders a, Users b
WHERE a.user_id=b.user_id AND a.order_id="1234"
```

Although the number of joins is reduced in the above query, it is not preferred by users because the user must manually alter the FROM clause and the WHERE clause in the SQL template every time a new query is developed. The prior art does not disclose an automated method for generating only the necessary table joins in both the FROM clause and the WHERE clause. Therefore, a need exists in the art for a method for creating a query in which only the necessary tables are joined together.

Limiting the number of joins in a query is important because running the query utilizes an excessive amount of computing resources. In other words, processing the query requires large amounts of processing power, computer memory, and time. Computer resources and time are valuable to database administrators who seek methods for decreasing costs and increasing available resources. Therefore, a need exists in the art for a method and system for reducing the time and resources required to process a query.

The prior art has previously addressed the need for decreasing the amount of time and resources required to process a query. U.S. Pat. No. 5,680,603 (the '603 patent) entitled "Method and Apparatus for Reordering Complex SQL Queries Containing Inner and Outer Join Operations" discloses a method which translates the query into a hypergraph representation and generates required sets, conflict sets, and preserved sets for the hypergraph. Using the required sets, the '603 patent enumerates a plurality of plans which represent associative reorderings of relations in the query. The SQL operators are selectively assigned to each of the enumerated plans using the conflict sets and/or preserved sets, so that the results from the plans are identical to the original query. While the method disclosed in the '603 patent reduces the execution time of a query, it does not address the problem of limiting the number of table joins in the query. Therefore, a need exists for a method of reducing the execution time of a query in which only the necessary tables are joined together.

SUMMARY OF THE INVENTION

The present invention is an automated method for creating only the necessary joins in a query. The software embodiment of the present invention comprises a Query Program (QP), a Query Generation Program (QGP), and a Clause Generation Program (CGP). The QP accepts the query fields, filters, and sort criteria from the user, creates the query, sends the query to the database, and displays the query results. The QGP creates the query clause strings and inserts the strings into the SQL template. The QGP generates the SELECT, (filter) WHERE, and ORDER BY clauses. The QGP analyzes each parameter in a parameter list to determine if the parameter is on the added aliases list. If the parameter is not on the added aliases list, the QGP runs the CGP for the parameter. After analyzing the parameters, the QGP analyzes the optional where clause aliases in the optional where clause aliases list to determine if the optional where clause aliases are in the added aliases list. The QGP generates (join) WHERE clauses for the optional where clause aliases that are in the added aliases list. When all of the optional where clauses aliases have been analyzed, the QGP inserts the FROM clause string, the JOIN clause string, and the (join) WHERE clause string into the SQL template.

The CGP generates the FROM, JOIN, and (join) WHERE clauses and adds the clauses to the appropriate clause strings. The CGP generates a FROM clause if there is a FROM clause placeholder in the SQL template and the table declared by the FROM clause has not already been specified in the SQL template. The CGP generates a JOIN clause if there is a JOIN clause placeholder in the SQL template and a FROM clause has not already been generated for the parameter. The CGP then generates the (join) WHERE clause and adds the alias to the added aliases list. The CGP also adds any parameters that depend on the added alias to the optional where clause aliases list.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "added aliases list" shall mean a list which is initially empty and is populated by aliases which have been defined in a SQL template, a FROM clause string, or a JOIN clause string.

As used herein, the term "alias" shall mean an alternative label for a table or other object in a database.

As used herein, the term "analyze" shall mean to iterate through a list until a condition is met.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "FROM clause" shall mean a clause specifying at least one table from which an output will be derived and optionally creating an alias for each table.

As used herein, the term "JOIN clause" shall mean a clause for joining a plurality of tables together.

As used herein, the term "optional where clause aliases list" shall mean a list of aliases, paired with their corresponding optional where clauses, which need to be added to a SQL template only if the alias is present in the added aliases list. The addition of an optional where clause alias to the SQL template is determined by whether the alias that the optional where clause alias depends on has been added to the added aliases list.

As used herein, the term "ORDER BY clause" shall mean a clause which specifies how an output should be sorted.

As used herein, the term "parameter" shall mean an alias in a column mapping, the column mapping relating a field or filter to a column in a database.

As used herein, the term "placeholder" shall mean a control character for marking a specific place in a SQL template.

As used herein, the term "SELECT clause" shall mean a clause which specifies the desired columns in an output.

As used herein, the term "SQL template" shall mean a listing of computer code which contains the necessary language for a query but lacks the specific fields and filter data to produce the output of the query.

As used herein, the term "WHERE clause" shall mean (1) a clause which specifies the criteria that determines whether a row should be included in an output, or (2) a joining condition for joining a plurality of tables.

Figure 1:
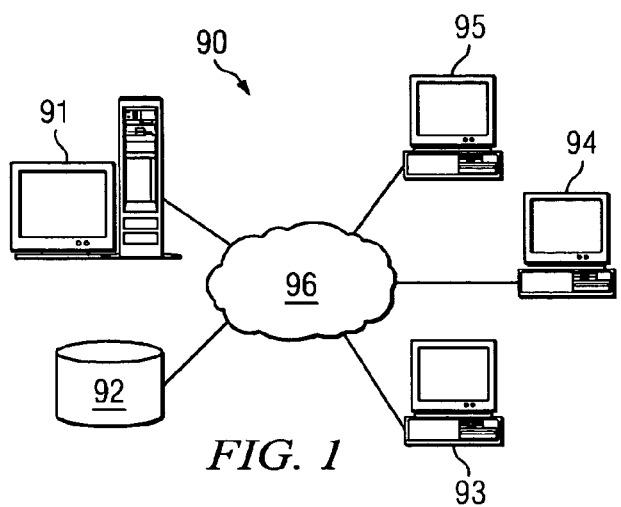
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
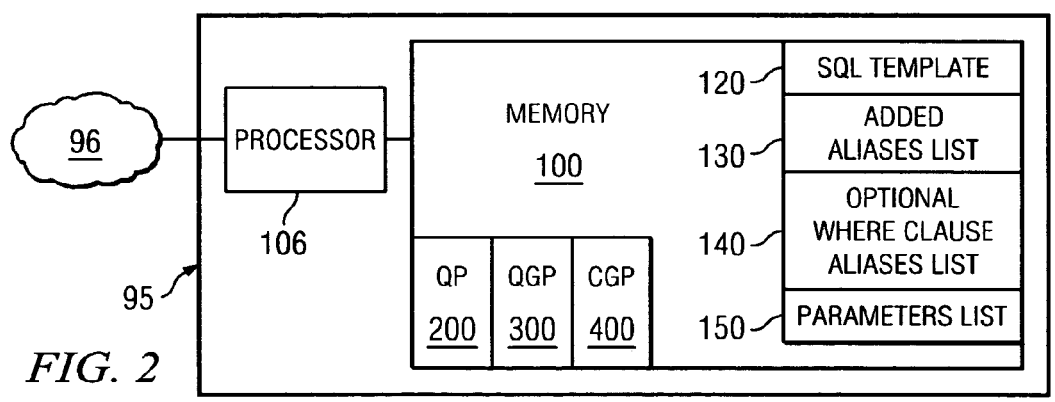
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Query Program (QP) 200, Query Generation Program (QGP) 300, and Clause Generation Program (CGP) 400. QP 200, QGP 300, and CGP 400 described herein can be stored within the memory of any computer depicted in FIG. 1. Alternatively, QP 200, QGP 300, and CGP 400 can be stored in an external storage device such as a removable disk, a CD-ROM, or a USB storage device. Memory 100 is illustrative of the memory within one of the computers of FIG. 1. Memory 100 also contains SQL template 120, added aliases list 130, optional where clause aliases list 140, and parameters list 150. The present invention may interface with SQL template 120, added aliases list 130, optional where clause aliases list 140, and parameters list 150 through memory 100. QP 200, QGP 300, and/or CGP 400 may modify SQL template 120, added aliases list 130, optional where clause aliases list 140, and parameters list 150. As part of the present invention, the memory 100 can be configured with QP 200, QGP 300, and/or CGP 400. Processor 106 can execute the instructions contained in QP 200, QGP 300, and/or CGP 400. Processor 106 and memory 100 are part of a computer such as local computer 95 in FIG. 1. Processor 106 can communicate with other computers via network 96.

In alternative embodiments, QP 200, QGP 300, and/or CGP 400 can be stored in the memory of other computers. Storing QP 200, QGP 300, and/or CGP 400 in the memory of other computers allows the processor workload to be distributed across a plurality of processors instead of a single processor. Further configurations of QP 200, QGP 300, and/or CGP 400 across various memories are known by persons of ordinary skill in the art.

Figure 3:
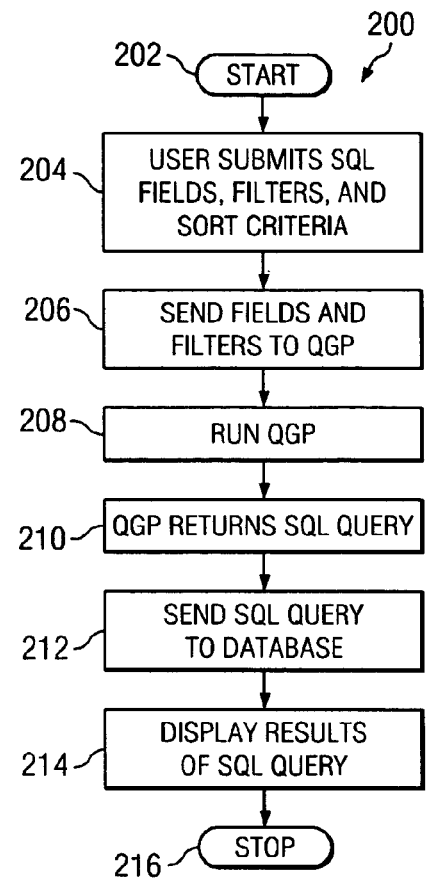
FIG. 3 is an illustration of the logic of the Query Program (QP) of the present invention.

Turning to FIG. 3, the logic of Query Program (QP) 200 is illustrated. QP 200 is a program which accepts the user's input for the query, generates the query, sends the query to the database, and displays the result of the query. For the purposes discussed herein, the user may be a database administrator or any other person of ordinary skill in the art. QP 200 starts (202) when invoked by the user. The user then submits the SQL fields and filters (204). The fields are the desired columns in the output and the filters are the desired rows in the output. The column map relates the field and filter information to a specific column or columns in a table. The aliases used by QGP 300 and CGP 400 are obtained from the column maps. The fields and filters may contain sorting information as well. The user may submit the fields and filters via a web interface, a GUI, an automated program, or any other method known to persons of ordinary skill in the art. QP 200 contains a set of column maps for the database which translates requested fields into table columns. Persons skilled in the art are aware of other methods for implementing column maps. QP 200 then sends the fields and filters to QGP 300 (206), and runs QGP 300 (208). QGP 300 returns the query to QP 200 (210), and QP 200 uses the query to query the database (212). QP 200 then displays the results obtained from the database (214) and ends (216).

Figure 4:
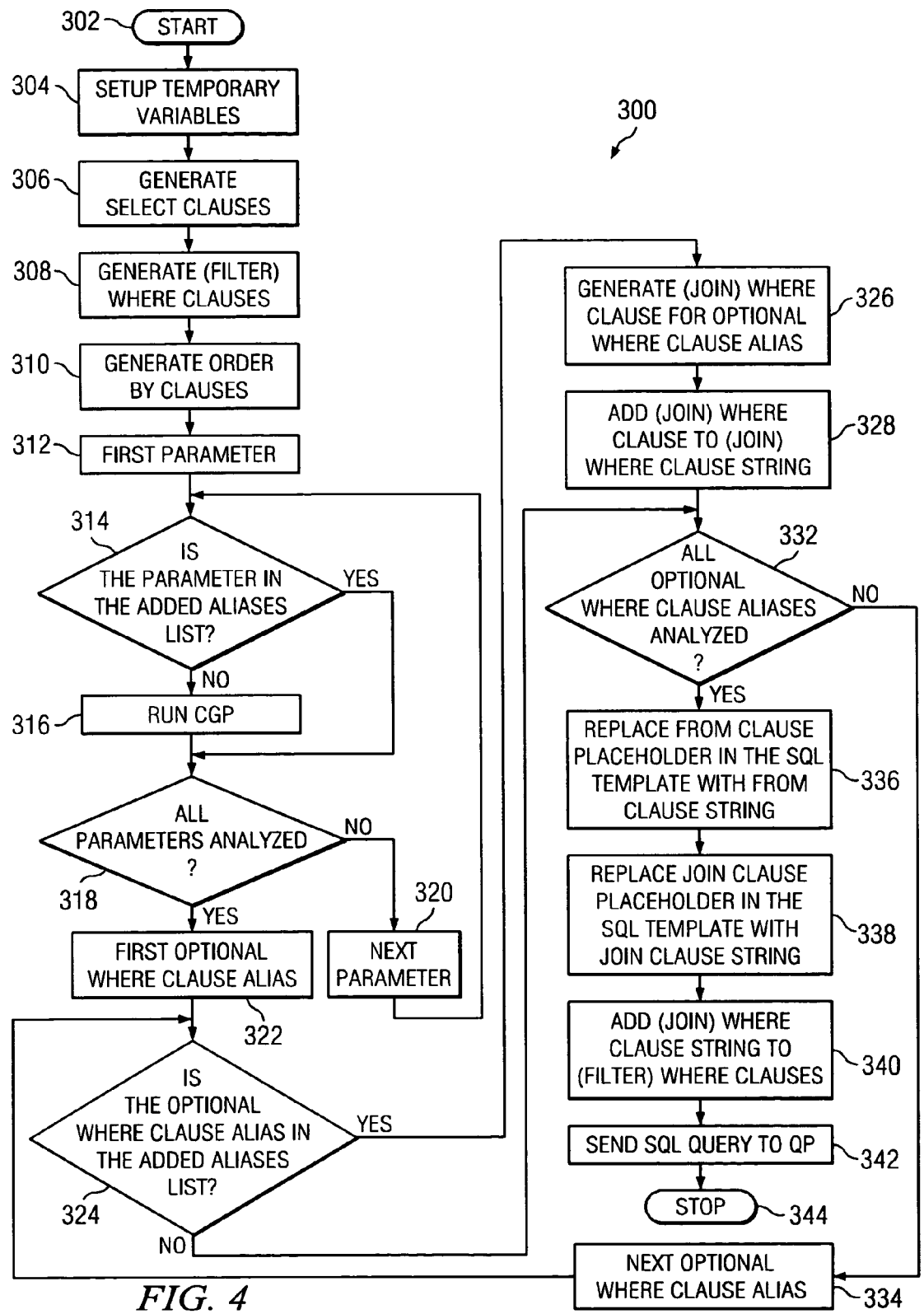
FIG. 4 is an illustration of the logic of the Query Generation Program (QGP) of the present invention.

Turning to FIG. 4, the logic of Query Generation Program (QGP) 300 is illustrated. QGP 300 is a program which generates the query and sends the query to QP 200. QGP 300 starts (302) when invoked by QP 200. QGP 300 sets up a number of temporary variables for use by the present invention (304). For example, QGP 300 initializes a FROM clause string, a JOIN clause string, and a (join) WHERE clause string. QGP 300 can setup other temporary variables as determined by a person of ordinary skill in the art. QGP 300 then generates the SELECT clauses and inserts the SELECT clauses into the SQL template (306). SQL template may be like SQL template 120 in FIG. 2. The SELECT clauses specify the desired columns in the output. QGP 300 may generate the SELECT clauses by any method known to persons of ordinary skill in the art. One method of generating the SELECT clauses is to insert the desired fields from box 204 in QP 200 after the SELECT statement in the SQL template. Persons of ordinary skill in the art are aware of other methods for generating SELECT clauses.

QGP 300 then generates the (filter) WHERE clauses and inserts the (filter) WHERE clauses into the SQL template (308). The (filter) WHERE clauses are the WHERE clauses that filter out the unwanted rows in the joined tables. (Filter) WHERE clauses should be distinguished from (join) WHERE clauses that are used to providing the joining condition between two tables. QGP 300 may generate the (filter) WHERE clauses by any method known to persons of ordinary skill in the art. One method of generating the (filter) WHERE clauses is to insert the desired filters from box 204 in QP 200 after the WHERE statement in the SQL template. Persons of ordinary skill in the art are aware of other methods for generating (filter) WHERE clauses.

QGP 300 then generates the ORDER BY clauses inserts the ORDER BY clauses into the SQL template (310). The ORDER BY clauses specify the sorting criteria for the query output. QGP 300 may generate the ORDER BY clauses by any method known to persons of ordinary skill in the art. One method of generating the ORDER BY clauses is to insert the desired sort criteria from box 204 in QP 200 after the ORDER BY statement in the SQL template. Persons of ordinary skill in the art are aware of other methods for generating ORDER BY clauses.

QGP 300 then goes to the first parameter in the parameter list (312). The parameter list is a list of the aliases for the fields and filters. The parameter list may be like parameter list 150 in FIG. 2. QGP 300 makes a determination whether the parameter is in the added aliases list (314). The added aliases list is a list of aliases which have been added to the FROM clause string or the JOIN clause string. The added aliases list may be like added aliases list 130 in FIG. 2. If the parameter is in the added aliases list, QGP 300 proceeds to step 318. If the parameter is not in the added aliases list, QGP 300 runs CGP 400 (316) and proceeds to step 318. At step 318, QGP 300 determines whether all of the parameters in the parameters list have been analyzed (318). If all of the parameters in the parameters list have not been analyzed, QGP 300 proceeds to the next parameter on the parameter list (320) and returns to step 314. If all of the parameters on the parameter list have been analyzed, QGP 300 proceeds to step 322.

At step 322, QGP 300 goes to the first optional where clause alias on the optional where clause aliases list (322). The optional where clause aliases list is a list of aliases that determine whether a corresponding optional where clause will be added to the WHERE clause string. If the alias is present in the added aliases list, the optional where clause will be generated (326) and added to the (join) WHERE clause string. The optional where clause aliases list is discussed further in conjunction with step 430 in FIG. 5. Optional where clause aliases list may be like optional where clause aliases list 140 in FIG. 2. QGP 300 then determines whether the optional where clause alias is in the added aliases list (324). If the optional where clause alias is in the added aliases list, then the optional where clause is added to the query. Consequently, QGP 300 proceeds to step 332. If, however, the optional where clause alias is not in the added aliases list, then there is no need to add the joining condition in the optional where clause to the query. QGP 300 then adds the (join) WHERE clause to the (join) WHERE clause string (328).

QGP 300 then determines whether all of the optional where clause aliases have been analyzed (332). If all of the optional where clause aliases have not been analyzed, QGP 300 goes to the next optional where clause alias (334) and returns to step 324. If all of the optional where clauses have been analyzed, QGP 300 goes to the SQL template and replaces the FROM clause placeholder with the FROM clause string (336). The placeholder is a control character in the SQL template that indicates where a clause needs to be inserted. Placeholders exist in the SQL template for the FROM clause and the JOIN clause. Placeholders may exist for other clauses as needed. QGP 300 then replaces the JOIN clause placeholder in the SQL template with the JOIN clause string (338). QGP 300 then adds the (join) WHERE clause string to the (filter) WHERE clauses in the SQL template (340). QGP 300 then sends the query to QP 200 (342) and ends (344).

Figure 5:
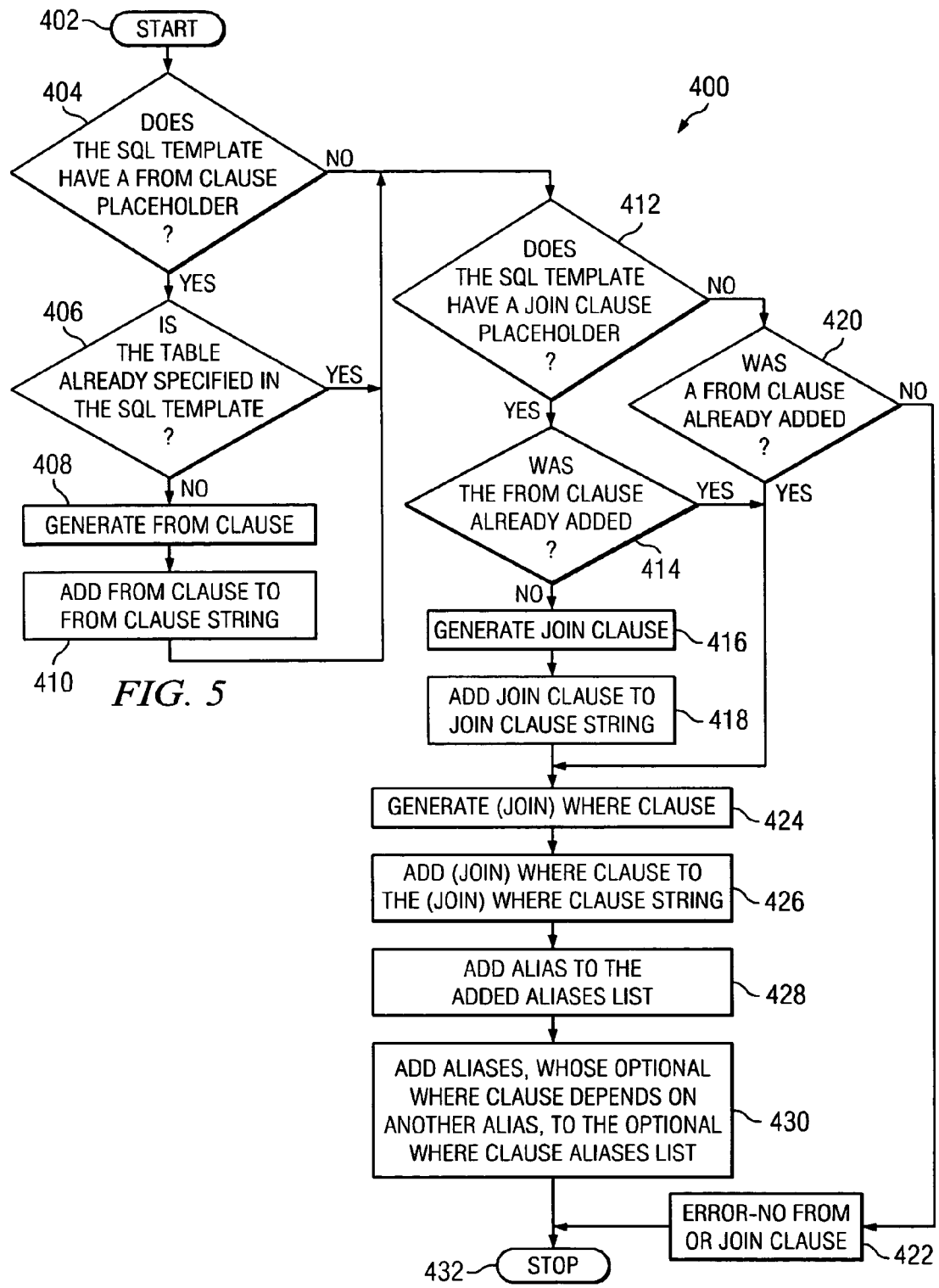
FIG. 5 is an illustration of the logic of the Clause Generation Program (CGP) of the present invention.

Turning to FIG. 5, the logic of the Clause Generation Program (CGP) 400 is illustrated. CGP 400 is a program that generates the FROM, JOIN, and (join) WHERE clauses and adds the clauses to the clause strings. CGP 400 starts (402) when invoked by QGP 300. CGP 400 determines whether the SQL template has a FROM clause placeholder (404). A FROM clause placeholder is a marker in the SQL template that indicates where the FROM clause string should be inserted. The FROM clause lists the table names with their aliases. The (join) WHERE clause can be used to accomplish an inner join between tables. If the user desires some other type of join, such as an outer join, then the other type of join occurs in the join statement. The placeholder in the SQL template indicates which type of clause the template requires, either a FROM clause or a JOIN clause. If the SQL template does not have a FROM clause placeholder, CGP 400 proceeds to step 412. Because both the FROM clause and the JOIN clause can define the alias, if both the FROM and JOIN clauses define a particular alias in the query, the query will be invalid.

If the SQL template has a FROM clause placeholder, then CGP 400 determines whether the table has already been specified in the SQL template (406). In determining if the table has already been specified, CGP 400 checks to see if the table has been defined with an alias in the SQL template. If the table has already been specified, CGP 400 proceeds to step 412. If the table has not been specified, CGP 400 generates the FROM clause for the table (408). The FROM clause lists the tables for the FROM clause along with their associated aliases. CGP 400 may generate the FROM clauses by any method known to persons of ordinary skill in the art. One method of generating the FROM clauses is to insert the table and alias after the FROM statement in the FROM clause string. Persons of ordinary skill in the art are aware of other methods for generating FROM clauses. CGP 400 then adds the FROM clause to the FROM clause string (410) and proceeds to step 412.

At step 412, CGP 400 determines whether the SQL template has a JOIN clause placeholder (412). If the SQL template does not have a JOIN clause placeholder, CGP 400 proceeds to step 420. If the SQL template has a JOIN clause placeholder, then CGP 400 determines if a FROM clause has already been added for the current alias (414). In other words, CGP 400 checks to see if the table and alias have been specified in the SQL template or the FROM clause string. If the FROM clauses has already been added, CGP 400 proceeds to step 424. If the FROM clause has not been added, CGP 400 generates the JOIN clause (416). The JOIN clause creates an alias for each table and joins together the tables listed in the JOIN clause. The user may specify the type of join in step 416. CGP 400 may generate the JOIN clauses by any method known to persons of ordinary skill in the art. One method of generating the JOIN clauses is to insert the table, alias and join criteria after the JOIN statement in the JOIN clause string. Persons of ordinary skill in the art are aware of other methods for generating JOIN clauses. CGP 400 then adds the JOIN clause to the JOIN clause string (418) and proceeds to step 424.

At step 420, CGP 400 determines whether a FROM clause has already been added, similar to the determination in step 414 (420). If a FROM clause has been added, CGP 400 proceeds to step 424. If a FROM clause has not been added, then CGP 400 throws an error stating that there is not a FROM clause or JOIN clause for the alias (422) and ends (432). At step 424, CGP 400 generates the (join) WHERE clause for the current alias (424). The JOIN clause creates an alias for each table and joins together the tables listed in the JOIN clause. CGP 400 may generate the (join) WHERE clauses by any method known to persons of ordinary skill in the art. One method of generating the (join) WHERE clauses is to add the joining condition to the (join) WHERE clause string. Persons of ordinary skill in the art are aware of other methods for generating (join) WHERE clauses. CGP 400 then adds the (join) WHERE clause to the (join) WHERE clause string (426). CGP 400 adds the alias from the FROM, JOIN, and/or (join) WHERE clause to the added aliases list (428). CGP 400 then adds any aliases whose optional where clauses depend on another alias to the optional where clause aliases list (430) and ends (432). The WHERE clauses are optional since they will be placed into the SQL template only if the alias the optional where clause depends on is found in the added aliases list.

One method of implementing an algorithm pseudo-code is shown below.

```
Method generateSQL( ) {
    // Global Vars
    sqlString = sqlTemplate.replace( '*', generateSelectClause( requestedFields ) );
    userWhere = generateUserWhere( filters );
    userOrderBy = generateUserOrderBy( sort );
    parameters = union( requestedFields, filterKeys );
    addedAliases = new ArrayList( );
    optionalWhereClauses = new HashMap( );
    fromClauseStr = "";
    joinClauseStr = "";
    // Main algorithm
    for int i = 0 to parameters.size( ) – 1
        // Get the column Bean based on the columnParameter attribute
        columnBean = retrieveColumnBean( parameters[i] );
        // Get the clause bean based on the "id" attribute
        currentAlias = columnBean.getColumnAlias( );
        clauseBean = retrieveClauseBean( currentAlias );
        if ( !(addedAliases.contains( currentAlias ) ) ) {
            generateClauses( currentAlias, fromClauseStr, joinClauseStr,
                    userWhere, addedAliases, optionalWhereClauses );
        }
    end for
    // Iterate over optionalWhereClauses to see if needed aliases were
    // appended
    for each key in optionalWhereClauses
        alias = optionalWhereClauses( key );
        if ( addedAliases.contains( alias ) ) {
            userWhere += " AND " + key;
        }
    end for
    // Concatenate sql template with dynamically generated from clause, joins, and
    // where clause
    sqlString = sqlString.replace( '$F', fromClauseStr );
    sqlString = sqlString.replace( '$J', joinClauseStr );
    return sqlString + userWhere + userOrderBy;
}
Method generateClauses( alias, fromClauseStr, joinClauseStr, userWhere, addedAliases,
        optionalWhereClauses ) {
    clauseBean = retrieveClauseBean( alias );
    // Generate FROM clause - We first check to see if the SQL template
    // had the table listed. If so, we don't generate the FROM clause.
    fromClauseBean = clauseBean.getFromClause( );
    generatedFromClauseStr = generateFromClause( fromClauseBean, alias );
    if ( fromClauseStr is empty ) {
        fromClauseStr += generatedFromClauseStr;
    }
    else {
        fromClauseStr += "," + generatedFromClauseStr;
    }
    // Generate JOIN clause (only if fromClause not added)
    joinClauseBean = clauseBean.getJoinClause( );
    generatedJoinClauseStr = generateJoinClause( joinClauseBean, alias,
                fromClauseStr, joinClauseStr, userWhere,
                addedAliases, optionalWhereClauses );
    joinClauseStr += generatedJoinClauseStr;
    // Generate additions to WHERE clause
    whereClauseBean = clauseBean.getWhereClause( );
    generatedWhereClauseStr = generateWhereClause( whereClauseBean, alias,
                fromClauseStr, joinClauseStr, userWhere,
                addedAliases, optionalWhereClauses );
    userWhere += " AND " + generatedWhereClauseStr;
    // Add this alias to the list of aliases that we've appended so far
    addedAliases.add( alias );
```

-continued

```
}
Method generateFromClause( fromClauseBean, alias ) {
    fromClause = "";
    // The $Q is a placeholder for the database schema and will be
    // substituted at run time.
    if ( fromClauseBean.getTable( ) != null ) {
        fromClause = "$Q." + fromClauseBean.getTable( ) + " " + alias;
    }
    return fromClause;
}
Method generateJoinClause( joinClauseBean, alias, fromClauseStr, joinClauseStr,
    userWhere, addedAliases, optionalWhereClauses ) {
    currentJoinClause = "";
    for each joinClause in joinClauseBean.getJoinClauses( )
        dependentAlias = joinClause.getDepends( );
        blnOptional = joinClause.getOptional( );
        blnDependentAliasExists = addedAliases.contains( dependentAlias );
        if ( blnDependentAliasExists ) {
            currentJoinClause += joinClause.getJoinClause( );
        }
        else {
        // This join is not optional, and we currently have not added the alias, so
        // add it now
            generateClauses( dependentAlias, fromClauseStr, joinClauseStr,
                userWhere, addedAliases, optionalWhereClauses );
            currentJoinClause += joinClause.getJoinClause( );
        }
    end for
    return currentJoinClause;
}
Method generateWhereClause( whereClauseBean, alias, fromClauseStr, joinClauseStr,
userWhere,
    addedAliases, optionalWhereClauses ) {
    currentWhereClause = "";
    for each whereClause in whereClauseBean.getWhereClauses( )
        dependentAlias = whereClause.getDepends( );
        blnOptional = whereClause.getOptional( );
        blnDependentAliasExists = addedAliases.contains( dependentAlias );
        if ( blnDependentAliasExists ) {
            currentWhereClause += " AND " +
whereClause.getWhereClause( );
        }
        else if ( blnOptional ) {
        // Put this where Clause and alias in the optionalWhereClauses HashMap
        // because a future parameter may add this alias to our SQL
            optionalWhereClauses.put( whereClause.getWhereClause( ),
dependentAlias );
        }
        else {
    // This where clause is not optional, and we currently have not added the alias,
    // so add it now
            if ( dependentAlias is not null ) {
                generateClauses( dependentAlias, fromClauseStr,
                    joinClauseStr, userWhere, addedAliases,
                    optionalWhereClauses );
                currentWhereClause += " AND " +
whereClause.getWhereClause( );
            }
        }
    end for
    return currentWhereClause;
}
```

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. All equivalent relationships to those illustrated in the drawings and described in the specification are encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer implemented process for creating a database query comprising:

receiving a template which contains a necessary query language for the database query and a plurality of placeholders, but lacks a plurality of clauses required for the database query to produce a desired output;

receiving a user entry of a plurality of fields, a plurality of filters, and a sort criteria;

responsive to receiving the user entry of the plurality of fields, the plurality of filters, and the sort criteria, retrieving a plurality of aliases for the plurality of fields and the plurality of filters from a column map of a database;

generating a SELECT clause within the plurality of clauses based on the plurality of fields;

generating an ORDER BY clause within the plurality of clauses based on the sort criteria;

generating a first portion of a WHERE clause within the plurality of clauses based on the plurality of filters;

creating a first aliases list, which is initially empty;

creating a second aliases list, which is initially empty;

determining whether each of the plurality of aliases is present in the first aliases list;

responsive to a determination a first alias from the plurality of aliases is not present in the first aliases list, performing steps comprising:

when the template contains a FROM placeholder among the plurality of placeholders, inserting the first alias with a matching table name into a FROM clause within the plurality of clauses;

when the template does not contain the FROM placeholder among the plurality of placeholders but contains a JOIN placeholder among the plurality of placeholders, inserting the first alias with a matching table name and join criteria into a JOIN clause within the plurality of clauses;

when the template contains neither the FROM placeholder among the plurality of placeholders nor the JOIN placeholder among the plurality of placeholders, returning an error;

generating a second portion of the WHERE clause based on the JOIN clause for the first alias;

adding the first alias to the first aliases list;

adding the first alias and the second portion of the WHERE clause to the second aliases list, when the second portion of the WHERE clause depends on a second alias from the plurality of aliases, wherein the second aliases list contains a list of aliases, each of the aliases paired with a corresponding optional Where clause;

determining whether each of the plurality of aliases in the second aliases list is present in the first aliases list;

responsive to a determination that a third alias is present in both the second aliases list and the first aliases list, adding the optional Where clause corresponding to the third alias to the second portion of the WHERE clause;

adding the first portion and the second portion of the WHERE clause;

replacing the plurality of placeholders with the plurality of clauses;

wherein the database query joins only a plurality of tables from the database necessary to complete the query only when those aliases found in the first aliases list and in the second aliases list were added to the second portion of the WHERE clause; and querying, using a computer, the database with only the set of necessary tables;

obtaining an output from the database; and wherein unnecessary table joins are prevented.

* * * * *